United States Patent
Chen et al.

(10) Patent No.: US 9,467,752 B2
(45) Date of Patent: Oct. 11, 2016

(54) HANDLING VIDEO TRANSITION ERRORS IN VIDEO ON DEMAND STREAMS

(71) Applicant: Broadcom Corporation, Irvine, CA (US)

(72) Inventors: Xuemin Chen, San Diego, CA (US); Jiang Fu, Irvine, CA (US); David P. Bogosh, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/484,848

(22) Filed: Sep. 12, 2014

(65) Prior Publication Data

US 2015/0055014 A1    Feb. 26, 2015

Related U.S. Application Data

(60) Division of application No. 13/105,311, filed on May 11, 2011, now Pat. No. 8,837,660, which is a continuation of application No. 10/259,032, filed on Sep. 27, 2002, now Pat. No. 7,953,194.

(51) Int. Cl.
*H04L 27/06*  (2006.01)
*H04N 21/8547*  (2011.01)
(Continued)

(52) U.S. Cl.
CPC ........... *H04N 21/8547* (2013.01); *H04N 5/06* (2013.01); *H04N 7/173* (2013.01);
(Continued)

(58) Field of Classification Search
CPC ...... H04N 21/4325; H04N 21/4305; H04N 21/4307; H04N 21/4402; H04N 21/6587; H04N 5/4401; H04N 5/04; H04N 21/4886; H04N 21/8547; H04N 21/4147; H04N 21/44004; H04N 21/4333; H04N 21/44008; H04N 21/47217; H04N 19/44; H04L 1/0054; H04L 25/067; H04L 1/0046; H04L 1/0047
USPC ................ 370/394, 506; 348/500; 715/203
IPC ................................................ H04N 5/91,5/04
See application file for complete search history.

(56) References Cited

U.S. PATENT DOCUMENTS 5,828,414 A    10/1998  Perkins et al.
6,556,250 B1    4/2003  Zeidler et al.
(Continued)

OTHER PUBLICATIONS

Non-Final Office Action for U.S. Appl. No. 13/105,311 mailed Jan. 30, 2014.
(Continued)

*Primary Examiner* — Tesfaldet Bocure
(74) *Attorney, Agent, or Firm* — Foley & Lardner LLP; Christopher J. McKenna; Helen H. Zhang

(57) ABSTRACT

A system, method, and apparatus for handling transition errors is presented herein. The transition errors include handling unreported time base discontinuities during trick mode transition, miscalculated time stamps during trick mode transition, erroneous sequence end codes, and unreported broken group of picture transmission. Unreported time base discontinuities are detected by comparing the program clock reference (PCR) value of the data packet to the system time clock (STC). If the difference exceeds a predetermined threshold, the STC is set to the PCR value. Miscalculated time stamps are detected by examining the difference in PTS values between temporally adjacent data packets. If the difference is not within a margin of error from predetermined value, the PTS is disabled. Unreported broken groups of pictures are handled by skipping the first two B-frames of the first group of pictures following a trick mode transition. Erroneous sequence end codes are detected by determining whether a packet containing a sequence end code is associated with a time base change. If the packet is not associated with a time base change, the sequence end code is disregarded.

18 Claims, 6 Drawing Sheets

(51) Int. Cl.
  *H04N 7/173* (2011.01)
  *H04N 5/06* (2006.01)
  *H04N 21/43* (2011.01)
  *H04N 21/44* (2011.01)
  *H04N 21/472* (2011.01)

(52) U.S. Cl.
  CPC ..... *H04N 7/17309* (2013.01); *H04N 21/4305* (2013.01); *H04N 21/4307* (2013.01); *H04N 21/44008* (2013.01); *H04N 21/47217* (2013.01)

(56) References Cited

U.S. PATENT DOCUMENTS

| | | | |
|---|---|---|---|
| 6,611,624 | B1 | 8/2003 | Zhang et al. |
| 6,680,944 | B1 * | 1/2004 | Lym ................ H04L 12/40058 348/500 |
| 6,710,814 | B1 | 3/2004 | Ueno et al. |
| 6,754,280 | B2 | 6/2004 | Nguyen |
| 6,798,420 | B1 | 9/2004 | Xie |
| 6,801,544 | B1 | 10/2004 | Rijckaert et al. |
| 6,853,385 | B1 | 2/2005 | MacInnis et al. |
| 6,937,988 | B1 | 8/2005 | Hemkumar et al. |
| 6,975,324 | B1 | 12/2005 | Valmiki et al. |
| 7,027,713 | B1 * | 4/2006 | Hallberg ................ H04N 5/783 348/E5.007 |
| 7,123,307 | B1 | 10/2006 | Altmann |
| 7,218,841 | B2 * | 5/2007 | Sato ................. H04N 21/2368 375/E7.271 |
| 2002/0063796 | A1 | 5/2002 | Min |
| 2002/0082845 | A1 * | 6/2002 | Sato ................. H04N 21/2368 704/500 |
| 2002/0087999 | A1 | 7/2002 | Kashima |
| 2002/0100064 | A1 | 7/2002 | Ward et al. |
| 2003/0002587 | A1 | 1/2003 | Nguyen |
| 2003/0066094 | A1 | 4/2003 | van der Schaar et al. |
| 2003/0097663 | A1 | 5/2003 | Puputti |
| 2003/0142752 | A1 | 7/2003 | Demas et al. |
| 2003/0156342 | A1 * | 8/2003 | Yap ....................... G11B 20/10 360/39 |
| 2003/0165196 | A1 | 9/2003 | Demas et al. |
| 2006/0034337 | A1 | 2/2006 | Ryu et al. |
| 2007/0140307 | A1 * | 6/2007 | Mercier ........... G11B 20/00086 370/535 |

OTHER PUBLICATIONS

Notice of Allowance for U.S. Appl. No. 13/105,311 mailed May 12, 2014.
Non-Final Office Action for U.S. Appl. No. 10/259,032 mailed Sep. 5, 2007.
Non-Final Office Action for U.S. Appl. No. 10/259,032 mailed Feb. 19, 2008.
Non-Final Office Action for U.S. Appl. No. 10/259,032 mailed Aug. 7, 2008.
Final Office Action for U.S. Appl. No. 10/259,032 mailed Feb. 4, 2009.
Non-Final Office Action for U.S. Appl. No. 10/259,032 mailed Aug. 17, 2009.
Final Office Action for U.S. Appl. No. 10/259,032 mailed Mar. 29, 2010.
Notice of Allowance for U.S. Appl. No. 10/259,032 mailed Jan. 20, 2011.

* cited by examiner

HANDLING VIDEO TRANSITION ERRORS IN VIDEO ON DEMAND STREAMS

RELATED APPLICATIONS

This application is a divisional application of and claims the benefit of and priority to U.S. application Ser. No. 13/105,311, entitled "Handling Video Transition Errors In Video On Demand Streams" and filed May 11, 2011, which is a continuation of and claims the benefit of and priority to U.S. application Ser. No. 10/259,032, entitled "Handling Video Transition Errors In Video On Demand Streams" and filed on Sep. 27, 2002, each of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention is directed to digital video, and more particularly to handling video transition errors in video-on-demand streams.

Video-on-demand is a service which provides customers with the ability to select movies when they desire. The movie is then transmitted from a video rental business in combination with a video server. Utilizing current technologies digital video-on-demand servers usually deliver MPEG-2 transport streams for interactive services such as Pay-per-view, Quasi video-on-demand services, near video-on-demand services, and true video-on-demand services.

Pay-per-view (PPV) services are services which the user signs up and pays for specific programming, similar to existing cable television PPV services. Quasi video-on-demand services are services in which users are grouped based on a threshold of interest. Users can perform at the temporal control activities by switching to a different group. Near video-on-demand are services in which functions like forward and reverse are simulated by transition in discrete time intervals, normally on the order of five minutes. Such capabilities are provided by multiple channels with the same programming skewed in time. True video-on-demand services are services in which the user has complete control over the session presentation. The full-function VCR capabilities, including forward and reverse play, freeze, and random positioning. True video-on-demand needs only a single channel per customer.

To achieve VCR type capabilities, known as trick modes, a set of files for various tasks modes are generated in advance by preprocessing the MPEG data in the video-on-demand servers. For example, the fast forward file is generated by transmission of the I-frames only. The I-frames are transmitted at a frame rate of 10 frames/sec. When playing the fast forward file, although the frame rate is lower, the data rate is the same because I-frames are associated with a greater amount of data.

When a user selects a trick mode, the time base is likely to change. For example, during a fast forward, another video elementary stream is transmitted which is associated with another time base. During transition between the regular play mode and a trick mode, or vice versa, the video server should indicate the discontinuity in the time base to the decoder. Additionally, the video server must calculate time stamps for the other video elementary stream using the other time base. Additionally, after some transitions, a new video elementary stream is commenced starting from a particular picture, such as a return to normal play from pause. If the picture is in the middle of a group of pictures, the video server should indicate the foregoing to the decoder.

However, many preexisting video servers are not equipped to properly handle trick mode transitions. Consequently, the decoders generate a number of errors during trick mode transitions.

Accordingly, it would be advantageous if techniques for handling video transition errors are provided. Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

A system(s), method(s), and apparatus(es) for handling video transition errors in video-on-demand streams are presented herein. The video transition errors often occur because of erroneous operation of the video server.

In one embodiment, a decoder is configured to handle unmarked time base discontinuities. Time stamps for incoming packets are compared to a system time clock. In the case where the system time clock and the time stamp differ by more than a predetermined threshold, the system time clock is changed to the time stamp of the data packet. When the system time clock is changed, the video decoder automatically disables time management and decodes packets received prior to the system time clock change using the vertical synchronization pulse for synchronization. After the packets received prior to the system time clock change are decoded, the time management is enabled using the changed system clock value.

In another embodiment, a decoder is configured to handle unmarked time base discontinuities between an original time base and a new time base by calculating time stamps using the original time base. The time stamps based on new time base are replaced by the calculated time stamps using the original time base.

In another embodiment, miscalculated time stamps are detected when film coded pictures are received after a transition for display using the NTSC standard. The difference between the time stamps of an instant picture and a previous picture is calculated and compared, either to the time length for two fields, or three fields. The difference is compared to the time length for three fields, wherein the previous frame includes a repeat_first_field parameter. Otherwise, the difference is compared to the time length for two fields. In the case where the difference is not within a predetermined margin of error from the compared time length, the time stamp for the instant packet is disabled.

In another embodiment, miscalculated time stamps are detected when film coded pictures are received after a transition for display using the PAL standard. The difference of time stamps between an instant picture and a previous picture is compared to the time length for two fields. In the case where the difference is not within a predetermined margin of error from the compared time length, the time stamp for the instant packet is disabled.

In another embodiment, receipt of pictures in the middle of a group of pictures is handled by always skipping the first two B-pictures received after a transition.

In another embodiment, erroneous sequence end codes are detected by determining if the sequence end code is accompanied by a time base change. If the sequence end code is not accompanied by a time base change, the sequence end code is determined to be erroneous and disregarded.

These and other advantages and novel features of the present invention, as well as details of an illustrated embodiment thereof, will be more fully understood from the following description and drawings.

DETAILED DESCRIPTION OF THE INVENTION

Although the following embodiments are described in the context of the MPEG-2 standard, it should be noted that the present invention is not limited to the MPEG-2 standard and is also applicable in other contexts.

Figure 1:
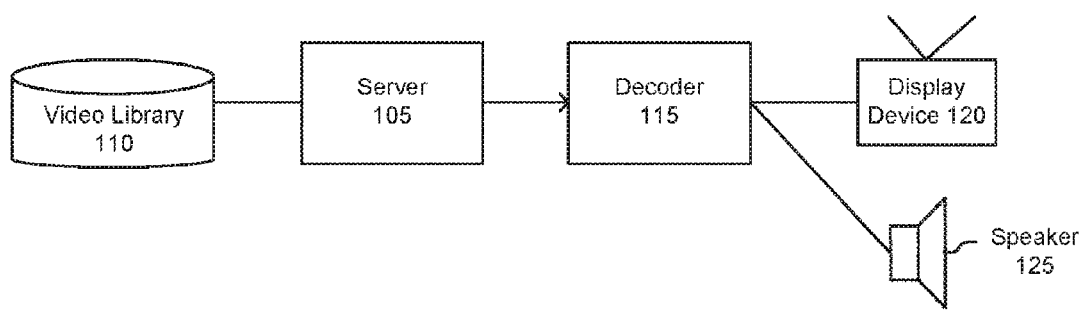
FIG. 1 is a block diagram of an exemplary video distribution system wherein the present invention can be practiced.

Referring now to FIG. 1, there is illustrated a block diagram of an exemplary video-on-demand system 100 for transporting a video program to a remote display device 120. The video-on-demand system 100 includes a video server 105 and a video library 110. The video server 105 is capable of selecting a particular video program from the video library 110 and transmitting the video program as a bit stream to a particular destination using a communication channel. The video program includes both a video stream component and audio stream component. Due to bandwidth and memory considerations, the video program is stored and transmitted in a compressed format known as MPEG-2. Pursuant to MPEG-2, the video is represented by a video elementary stream and the audio is represented by an audio stream. At the destination, the video program is received and displayed on a display device 120. Accordingly, with reference to FIG. 1, the bit stream is received by a decoder 115 which decodes the component video and audio, resulting in a video and audio stream. The video stream is then displayed on a display device 120, and the audio stream is sent to a speaker 125.

The particular video program that is selected by the video server 105 can be determined by a user associated with the decoder 115. A user can cause the decoder 115 to transmit a signal to the video server 105 indicating a particular video program. Responsive thereto, the video server 105 selects the video program from the video library 110 and transmits the video program to the decoder 115. Additionally, the video server 105 provides various modes of operation, known as trick modes, wherein the user at decoder 115 can control the flow of the video, using video cassette recorder-like functions. The trick modes allow the user to fast forward, rewind, jump, and pause the video.

Figure 2A:
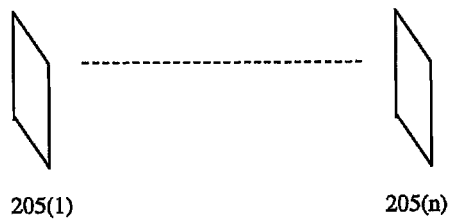
FIG. 2A is a block diagram of an exemplary video stream.

As noted above, the video program is stored as a component video elementary stream and audio elementary stream. Referring now to FIG. 2, there is illustrated a block diagram describing the compression of a video in accordance with the MPEG-2 standard. In FIG. 2A, there is illustrated an exemplary video stream. A video stream is a series of instantaneous images associated with particular time intervals. Each image is associated with a frame 205 (1) ... 205($n$). A frame 205 is a two-dimensional grid of pixels, wherein each pixel in the grid corresponds to a particular spatial location of the image at the particular time interval. In some cases, the frames 205 can comprise two fields, wherein the fields are associated with adjacent time intervals.

Pursuant to MPEG-2 the frames 205(1) ... 205($n$) are encoded using algorithms taking advantage of both spatial redundancy and/or temporal redundancy, thereby resulting in a video elementary system. The algorithms taking advantage of spatial redundancy utilize discrete cosine transformation (DCT), and quantization, to reduce the amount of data required to code each picture.

The algorithms taking advantage of temporal redundancy use motion compensation based prediction. With frames 205 which are closely related, it is possible to accurately represent or "predict" the data of one picture based on the data of a reference frame 205, provided the translation is estimated. Pictures can be considered as snapshots in time of moving objects. Therefore, ones frame 205 can be associated with a displacement of another frame 205.

Pursuant to the MPEG Standard, many frames 205 are predicted from another reference frame(s) 205. A two-dimensional motion vector(s) represents the vertical and horizontal displacement between the frame 205 and the reference frame(s) 205. The difference between the frame 205 and the reference frame 205 is the prediction error. The prediction error can be encoded in the DCT domain using a small number of bits for representation.

Figure 2B:
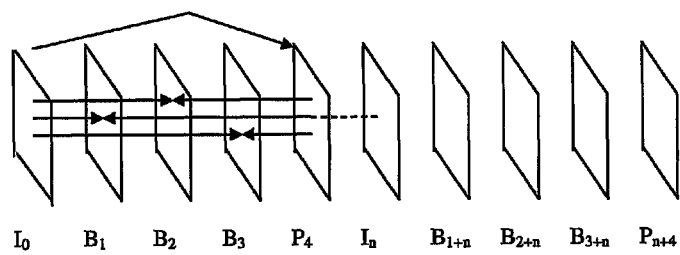
FIG. 2B is a block diagram of exemplary encoded frames.

Referring now to FIG. 2B, there is illustrated an exemplary block diagram of encoded frames, known as pictures $I_0$, $B_1$, $B_2$, $B_3$, $P_4$ ..., $I_n$, $B_{1+n}$, $B_{2+n}$, $B_{3+n}$, and $P_{4+n}$, representing the video stream in FIG. 2A. The data dependence of each picture is illustrated by the arrows. For example, picture $B_3$ is dependent on pictures $I_0$ and $P_4$. Pictures coded using temporal redundancy with respect to earlier pictures of the video sequence are known as predicted pictures (or P-pictures), for example picture $P_4$. Pictures coded using temporal redundancy with respect to earlier and later pictures of the video sequence are known as bi-directional pictures (or B-pictures), for example, pictures $B_1$, $B_2$, $B_3$. Pictures which are not coded using temporal redundancy are known as I-pictures, for example $I_0$.

Figure 2C:
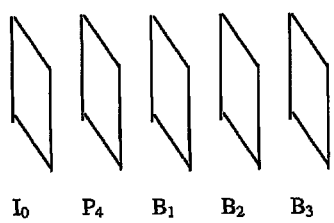
FIG. 2C is a block diagram of encoded frames in data dependent order.

The foregoing data dependency among the pictures requires decoding of certain pictures prior to others. Additionally, the use of later pictures as reference pictures for previous pictures, requires that the later picture is decoded prior to the previous picture. As a result, the pictures cannot be decoded in temporal order. Accordingly, the pictures are transmitted in data dependent order. Referring now to FIG. 2C, there is illustrated a block diagram of the pictures in data dependent order.

Figure 2D:
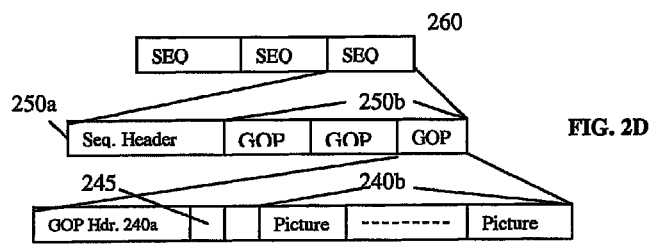
FIG. 2D is a block diagram of the MPEG hierarchy.

The pictures are further divided into groups known as groups of pictures (GOP). Referring now to FIG. 2D, there is illustrated a block diagram of the MPEG hierarchy. The pictures of a GOP are encoded together in a data structure comprising a GOP Header 240*a* and a GOP Payload 240*b*. The GOP Header 240*a* includes a broken link bit 245. The broken link bit 245 permits play of the GOP in midstream. The GOP Payload 240*b* stores each of the pictures in the GOP in data dependent order. GOPs are further grouped together to form a sequence. The GOPs of the sequence are encoded together in a data structure comprising a sequence header 250*a* and a sequence payload 250*b*.

The video is represented by any number of sequences. The encoded sequences together form the video elementary stream 260. Responsive to a user selection, the video server 105 packetizes the video elementary stream 260 and an associated audio elementary stream. Each video elementary stream packet is associated with a particular picture. The packetized video elementary stream 260 packets are then placed in transport packets. The transport packets are transmitted over the communication channel to the destination.

Figure 3:
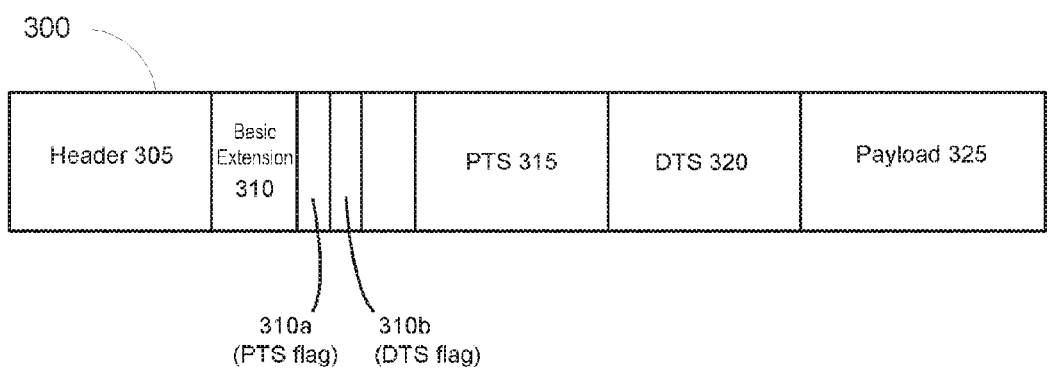
FIG. 3 is a block diagram of an exemplary packetized video elementary stream.

Referring now to FIG. 3, there is illustrated a block diagram describing an exemplary video elementary stream packet 300. The video elementary stream packet 300 includes a packet header 305, a basic extension 310, an optional presentation time stamp (PTS) field 315, an optional decoding time stamp (DTS) field 320, and a payload 325. The header 305 comprises five bytes, followed by the basic extension 310 which comprises three bytes. The basic extension 310 includes a PTS flag 310*a*, and a DTS flag 310*b*. In the case where the PTS flag 310*a* is set, the PTS field 315 comprising five bytes is appended to the basic extension. In the case where the DTS flag 310*b* is set, the DTS field 320 comprising five bytes is appended to the basic extension. The combination of the DTS flag 310*b* set only is not permitted. The PTS field 315 stores a 33-bit PTS, while the DTS field 320 stores a 33-bit DTS.

Figure 4:
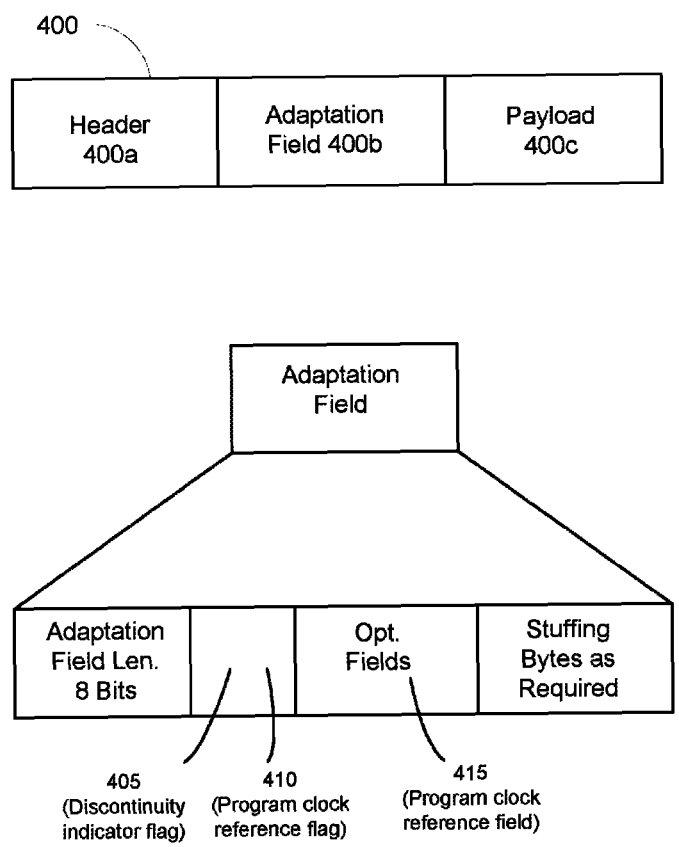
FIG. 4 is a block diagram of an exemplary transport packet.

Referring now to FIG. 4, there is illustrated a block diagram of an exemplary transport packet 400. The transport packet 400 includes a header 400*a*, an adaption field 400*b*, and a payload 400*c*. The adaptation field 400*b* includes a discontinuity indicator flag 405, a program clock reference flag 410, and can include a program reference clock field 415.

The program reference clock value 415 is used to synchronize the system time clock of the video server 105 with the MPEG decoder 115. Each video program is associated with a particular system time clock. Synchronization of the system time clock at the video server 105 and the MPEG decoder 115 is achieved by sampling the system time clock when the transport packet is in a constant delay part of the transmission path. The sampled system time clock is inserted as the program reference clock value 415 every 100 ms. The existence of the program reference clock field 415 in the transport packet 400 is indicated by setting the program clock reference flag 410.

As noted above, the user can cause the video program to pause or fast forward using a trick mode. During a trick mode, the normal stream of frames 205 is interrupted. In the case of fast-forward, a fast-forward file associated with the video program is assembled into transport packets and transmitted to the user. The fast-forward file is also a video elementary stream, but contains only the I-pictures from the video elementary stream representing the video program. Since usually an I-frame is inserted at intervals of 15 pictures of the video elementary stream displaying the fast forward file appears like the video program is being played at a fast speed. When play is resumed, the video elementary stream representing the video program is again assembled into transport packets and transmitted. During a pause operation, the video server 105 stops transmitting the video transport stream after two B-pictures. When the user returns to play mode, the video transport stream is resumed.

Many of the trick modes involve discontinuities in the play of the video elementary stream representing the video program. At the transition point, the video server 105 signals the decoder 115, indicating the discontinuity. The discontinuity is indicated to the decoder 115 because the decoder 115 maintains the time base of the video elementary stream representing the video program. During the trick mode, the time base can be changed. For example, during fast forward, the fast forward file is associated with a different program reference clock. The discontinuity is generally indicated by transmission of a transport packet 400 with the discontinuity indicator 405 set, a new program clock reference stored in the program clock reference field 415, and the payload 400*c* containing a video sequence end code.

Many low cost and older video servers 105 fail to transmit the appropriate indicators during trick mode transition. As a result, various error types can occur. For example, a PCR discontinuity error occurs when the video server 105 sends a video elementary stream 260 with another time base, but fails to set the discontinuity bit 405. Upon receiving the video elementary stream 260 with the new time base, the decoder 115 generates PCR discontinuity errors. However, the foregoing PCR discontinuity errors can be avoided by detecting that the difference between the received PCR and the STC exceeds a certain programmable threshold. Responsive, thereto, the time base can be changed to the new PCR.

Figure 5:
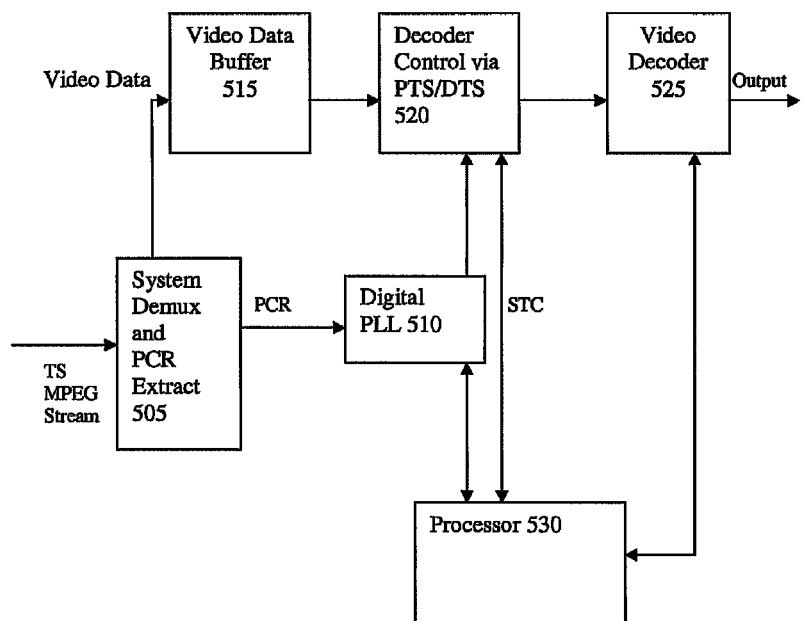
FIG. 5 is a block diagram of a decoder in accordance with an embodiment of the present invention.

Referring now to FIG. 5, there is illustrated a block diagram of an exemplary MPEG decoder 115 in accordance with an embodiment of the present invention. The MPEG decoder 115 comprises a system demultiplexer 505, a digital phase lock-loop 510, a video data buffer 515, a decoder controller 520, a video decoder 525, and a processor 530. The MPEG decoder 115 receives a transport stream of MPEG transport packets 400 at the system demultiplexer 505 from the communication channel. The system demultiplexer extracts the PCR 415 and provides the PCR 415 to the digital phase lock-loop 510. The digital phase-lock loop 510 maintains the system time clock (STC) for the MPEG decoder 115. The digital phase-lock loop 510 compares the PCR 415 to the system time clock, unless the PCR discontinuity bit 405 is set. If the discontinuity bit 405 is set, the digital phase lock loop 510 updates the system time clock to the PCR 415.

If the discontinuity bit 405 is not set, the PCR 415 should correspond within a certain margin of error to the system time clock. Normally during trick mode transition, the discontinuity bit 405 should be set. However, as noted above, many low cost servers do not set the discontinuity bit 405 during the transition. During a trick mode transition, the PCR 415 is based on a new time base and is likely to be significantly different from the system time clock. Accordingly, if the PCR 415 and the system time clock differ by more than a predetermined threshold, it is likely that the difference is due to a change in time base. Accordingly, the digital phase-lock loop 510 transmits an interrupt to the processor 530, indicating that the PCR 415 and the system time clock differ by more than a predetermined threshold.

Responsive thereto, the processor 530 programs the digital phase-lock loop 510 to update the system time clock with the new PCR. When the system time clock is changed, the video decoder 525 will automatically disable time base management at the decoder control 520 to allow pictures stored in the video data buffer 515 that are still based on the previous time base to continue to be decoded. While the pictures based on the previous time base are decoded, the video decoder 525 operates in the V-synch mode, wherein the pictures are decoded at each vertical synchronization pulse. Once all pictures based on the previous time base are decoded and displayed, the video decoder 525 automatically enables time base management at the decoder control 520.

Alternatively, for decoders 115 which are not able to quickly adapt to the time base change, the interrupt is handled by disabling the PCR and system time clock comparison at the phase-lock loop 510. The processor calculates the DTS and PTS using the original time base and inserts the calculated DTS and PTS in the DTS field 320 and the PTS field 315, respectively. The DTS is calculated by incrementing the DTS from the original time base for each picture. The DTS is calculated using the following formula:

$$DTS(n+1)=DTS(n)+[90\ KHz*(2+repeat\_first\_filed)]/(frame\_rate*2)$$

The PTS can be calculated from the DTS in a manner well known in the art.

Another problem encountered during trick mode transition is mislabeled time stamps. In some cases, the PTS 315 and DTS 320 are miscalculated or omitted altogether by the video server 105. Therefore, the pictures during the transition are not decoded and presented at the appropriate times. The PTS 315 and DTS 320 miscalculations sometimes occur because the pictures are in film mode and the video server 105 does not adjust the calculations for display using the National Television Standard Committee (NTSC) Standard.

When the pictures are in film mode, each picture is divided into two fields. Each field is displayed at a rate of 60 field/sec. However, because the film mode records only 24 frames per second, only 48 fields per second are produced. In order to display the 48 fields in proper synchronization, one out of every four fields is repeated. The miscalculated PTS 315 and DTS 320 can be corrected by the processor 530. In the case where the MPEG decoder 115 detects a transition and is receiving film mode pictures, the processor 530 checks for the correct PTS value 315 for each picture. If the processor 530 finds an incorrect PTS value, the processor 530 disables the PTS and DTS.

Figure 6:
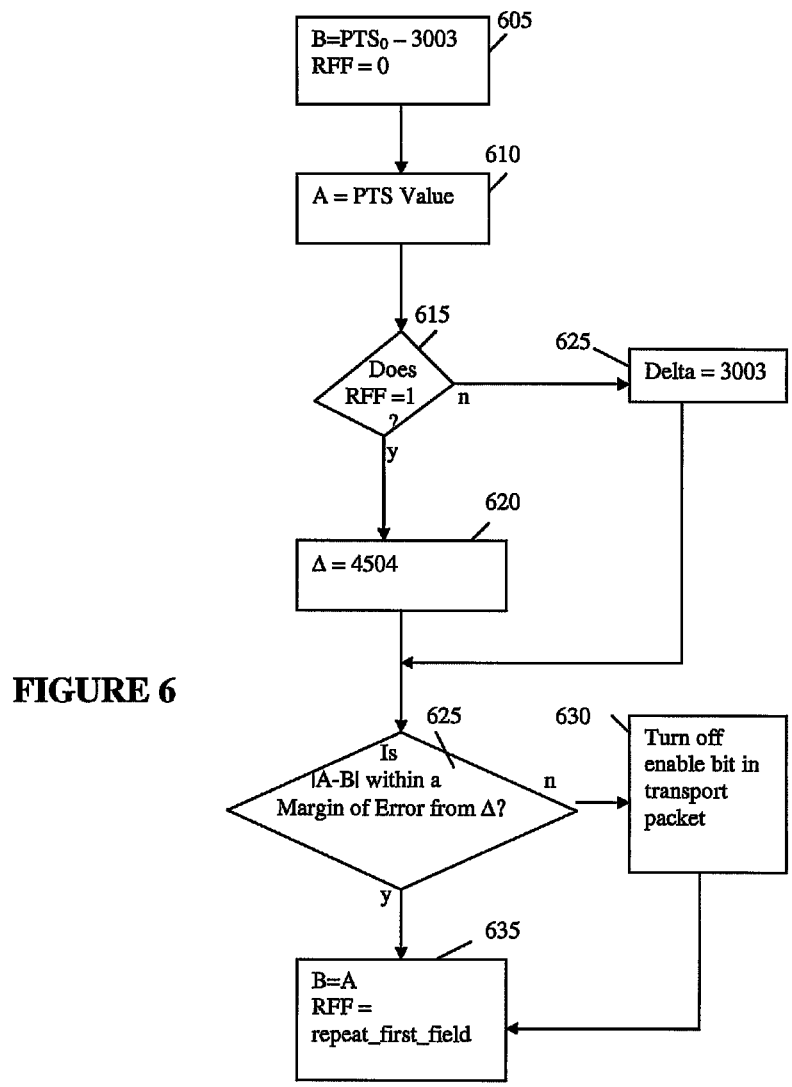
FIG. 6 is a flow diagram describing detection of erroneous PTS values for NTSC displays in accordance with an embodiment of the present invention.

Referring now to FIG. 6, there is illustrated a flow diagram describing detection of PTS errors for film mode pictures displayed using the NTSC standard, responsive to detection of a trick mode transition, in accordance with an embodiment of the present invention. At 605, the variable B is set equal to the PTS value 315 for the first picture after the trick mode transition is detected minus 3003, and RFF is initialized to zero. The variable B is used to store the PTS of the last picture and the variable RFF is used to store the repeat_first_field parameter extracted from the picture coding extension for the previous picture. For the first picture after the transition, RFF is initialized to zero. At 610, A is set equal to the PTS value 315 for the instant picture.

A determination is made whether the previous picture included a field that was repeated (615). If the last previous picture included a field that was repeated, the PTS for the for the instant picture is incremented from the PTS of the previous picture by the amount of time required for display of three frames, instead of two. Using 90 KHz timing, and a display rate of 60 fields/sec, the amount of time is 4504 cycles. Accordingly, if the last previous picture included a field that was repeated, delta is set to 4504 at 620.

However, if the previous picture did not include a field that was repeated, the picture is incremented by the amount of time required for display of two frames, e.g., 3003. Accordingly, if the last previous picture included a field that was not repeated, delta is set to 3003 at 625. At 625, the difference between the PTS 315 for the instant picture and the PTS 315 for the previous picture is compared to the calculated increment, delta. If the difference is not within a certain predetermined margin of error, e.g., 2, from delta during 625, the PTS is incorrect and the processor disables (at 630) the PTS and DTS by clearing the enable bit in the PES packet header. If the difference is within a certain predetermined margin of error from delta during 625, the PTS 315 is correct and 630 is bypassed. At 635, the variable is set to the PTS value 315 of the instant packet and RFF is set to the repeat_first_frame for the instant packet and 610-635 are repeated for the next picture.

Figure 7:
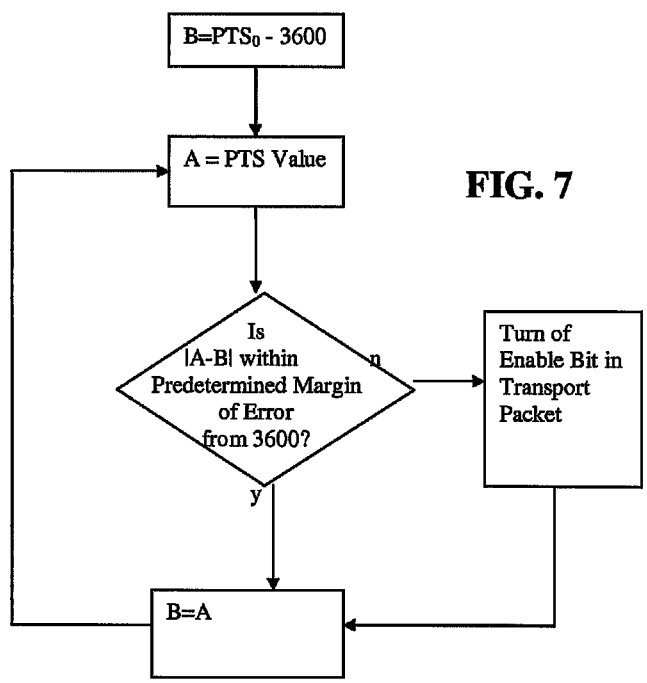
FIG. 7 is a flow diagram describing detection of erroneous PTS value for PAL displays in accordance with an embodiment of the present invention.

Referring now to FIG. 7, there is illustrated a flow diagram for detecting PTS errors wherein the pictures are displayed using the PAL standard, in accordance with an embodiment of the present invention. The PAL standard displays 25 frames per second. At 705, the variable B which stores the PTS value of the previous picture is initialized for the first picture after the transition by setting the variable B to the PTS value 315 of the instant packet minus the time for the display of one picture, e.g., 3600. At 710, the variable A is set to the PTS value 315 of the instant picture. At 715, the difference between the PTS value 315 of the instant picture and the PTS value 315 of the previous picture is compared to 3600. If the difference is not within a predetermined margin of error from 3600, the PTS is invalid. Accordingly, the processor 530 disables the PTS 315 and DTS 320 by clearing the enable bit in the transport packet (720). If the difference is within a predetermined margin of error from 3600, the PTS is valid and 720 is bypassed. At 725, the variable B is set to the PTS value 315 for the instant packet and 710-725 are repeated for the next picture.

Another problem encountered during trick mode transition is the appearance of block artifacts immediately after the transition. This can occur when the user transitions from fast forward or pause to play. When the user transitions from fast forward or pause to play, the pictures are transmitted starting at a particular picture. In the fast forward mode, the pictures are transmitted starting from the last displayed I-frame in the fast forward at the point where the user transitioned from fast forward to play. In the pause mode, the pictures are started from the last displayed picture at the point where the user paused the video. The starting pictures are likely to be in the middle of a GOP, as opposed to the start of the GOP. This can cause a problem when decoding B-pictures because the B-pictures might be predicted from pictures which were prior to the starting point. Therefore, after the transition, the video server 105 indicates to the MPEG decoder 115 that the pictures will start from the middle of a GOP. This is indicated by setting a GOP broken link bit in the first GOP. Setting the GOP broken link bit 245 causes the MPEG decoder 115 to discard the first two B-pictures in the first GOP. If the video server 105 fails to set the GOP broken link bit, the block artifacts can appear on the display.

The blocky artifacts which occur when the video server 105 fails to set the GOP broken link bit 245 are avoided because the processor 530 discards the first two B-frames after detecting a transition, regardless of whether the GOP broken link bit 245 is set.

Additionally, the processor 530 can detect erroneous sequence end codes by determining if the sequence end code is accompanied by a time base change. If the sequence end code is not accompanied by a time base change, the sequence end code is determined to be erroneous.

Based on the foregoing, those skilled in the art should now understand and appreciate that the foregoing advantageously provides a technique for handling common errors which occur during trick mode transitioning. The techniques presented herein can be used with preexisting video servers with requiring modifications to the video servers.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. For example, the flow diagrams of FIGS. 6 and 7 can be implemented as a series of instructions residing in a memory for execution by a processor, such as processor 530. Therefore, it is intended that the invention not be limited to the particular embodiment(s) disclosed, but that the invention will include all embodiments falling within the scope of the appended claims.

The invention claimed is:

1. A system comprising:
a decoder configured to:
receive a first data packet having a first time stamp and a second data packet having a second time stamp;
determine a difference between the first time stamp and the second time stamp;
select one of two predetermined values based on a parameter of the first data packet;
compare the difference between the first time stamp and the second time stamp to the selected one of the two predetermined values; and
disregard the second time stamp when the difference between the first time stamp and the second time stamp is not within a predetermined margin of error from the selected one of the two predetermined values.

2. The system of claim 1, wherein the parameter comprises a repeat_first_field parameter.

3. The system of claim 1, wherein when the decoder selects the one of two predetermined values, the decoder is further configured to:
select three field counts in response to the parameter of the first data packet being set; and
select two field counts in response to the parameter of the first data packet not being set.

4. The system of claim 1, wherein responsive to disregarding the second time stamp, the decoder is further configured to:
reset a bit in the second data packet.

5. The system of claim 1, wherein the decoder is further configured to:
receive a third data packet with a sequence end code; and
responsive to the third data packet not being associated with a time base change, disregard the sequence end code.

6. The system of claim 1, wherein the decoder is further configured to:
store one or more data packets received before the received first data packet and second data packet in a decoder buffer; and
decode the one or more data packets using a time base prior to receiving the first data packet and second data packet, the time base prior to receiving the first data packet and second data packet being different from a time base after receiving the first data packet and second data packet.

7. A method comprising:
receiving a first data packet having a first time stamp;
receiving a second data packet having a second time stamp;
determining a difference between the first time stamp and the second time stamp;
comparing the difference between the first time stamp and the second time stamp to a frame count; and
when the difference between the first time stamp and the second time stamp is greater than a predetermined margin of error from the frame count, disregarding the second time stamp.

8. The method of claim 7, wherein the frame count is a PAL frame count.

9. The method of claim 7, wherein disregarding the second time stamp further comprises:
resetting a bit in the second data packet.

10. The method of claim 7, further comprising:
receiving a plurality of data packets corresponding to an open group of pictures, wherein the plurality of data packets do not indicate a broken link group of pictures; and
identifying the open group of pictures as a broken link group of pictures.

11. The method of claim 10, wherein identifying the open group of pictures as a broken link group of pictures further comprises:
when the open group of pictures comprises B-frames, skipping a predetermined number of B-frames.

12. The method of claim 7, further comprising:
receiving a third data packet with a sequence end code; and
responsive to the third data packet not being associated with a time base change, disregarding the sequence end code.

13. A method comprising:
receiving a first data packet having a first time stamp and a second data packet having a second time stamp;
determining a difference between the first time stamp and the second time stamp;
selecting one of two predetermined values based on a parameter of the first data packet;
comparing the difference between the first time stamp and the second time stamp to the selected one of the two predetermined values; and
disregarding the second time stamp in response to the difference between the first time stamp and the second time stamp is not within a predetermined margin of error from the selected one of the two predetermined values.

14. The method of claim 13, wherein the parameter comprises a repeat_first_field parameter.

15. The method of claim 13, wherein the selecting further comprises:
selecting three field counts in response to the parameter of the first data packet being set; and
selecting two field counts in response to the parameter of the first data packet not being set.

16. The method of claim 13, further comprising:
responsive to disregarding the second time stamp, resetting a bit in the second data packet.

17. The method of claim 13, further comprising:
receiving a third data packet with a sequence end code; and responsive to the third data packet not being associated with a time base change, disregarding the sequence end code.

18. The method of claim 13, further comprising:

storing one or more data packets received before the received first data packet and second data packet in a decoder buffer; and decoding the one or more data packets using a time base prior to receiving the first data packet and second data packet, the time base prior to receiving the first data packet and second data packet being different from a time base after receiving the first data packet and second data packet.

* * * * *